(12) United States Patent
Hurt

(10) Patent No.: US 12,663,030 B2
(45) Date of Patent: Jun. 23, 2026

(54) COMPRESSION CONNECTOR FOR SECURING AXLE AND HANDLE PARTS

(71) Applicant: Vertex International, Inc., St. Cloud, MN (US)

(72) Inventor: Daniel Hurt, St. Cloud, MN (US)

(73) Assignee: Vertex International, Inc.

( * ) Notice: Subject to any disclaimer, the term of this patent is extended or adjusted under 35 U.S.C. 154(b) by 301 days.

(21) Appl. No.: 18/492,645

(22) Filed: Oct. 23, 2023

(65) Prior Publication Data

US 2024/0133402 A1     Apr. 25, 2024
US 2024/0229835 A9     Jul. 11, 2024

Related U.S. Application Data

(60) Provisional application No. 63/380,386, filed on Oct. 21, 2022.

(51) Int. Cl.
    *F16B 2/06*          (2006.01)
    *B25B 9/00*          (2006.01)
(52) U.S. Cl.
    CPC ................ *F16B 2/065* (2013.01); *B25B 9/00* (2013.01)

(58) Field of Classification Search
    CPC .. F16D 1/0882; F16D 1/087; Y10T 403/7067; Y10T 403/7024; F16B 2/065; B25B 9/00
    See application file for complete search history.

(56) References Cited

U.S. PATENT DOCUMENTS 4,411,550 A * 10/1983 Schutt ........................ F16B 2/14
                                                      403/358
5,902,066 A *  5/1999 Griffen ................. F16D 1/0882
                                                      403/374.3

* cited by examiner

*Primary Examiner* — Daniel J Wiley
(74) *Attorney, Agent, or Firm* — Gutwein Law; Tyler B. Droste

(57)          ABSTRACT

A compression connector for securing an apparatus to a mounting surface. The compression connector device can include a housing that can include a cavity configured to accept a wedge member within the cavity. The wedge member and cavity can include corresponding angular surfaces. A biasing means can be coupled to the wedge member or housing and configured to move the wedge member from a first position to a second position within the cavity. As the wedge member is moved to a second position a compressive force can be applied between the wedge and a mounting surface of an object.

17 Claims, 21 Drawing Sheets

COMPRESSION CONNECTOR FOR SECURING AXLE AND HANDLE PARTS

CROSS-REFERENCE TO RELATED APPLICATION

This U.S. Patent Application claims priority to U.S. Provisional Application 63/380,386 filed on Oct. 21, 2022, the disclosure of which is considered part of the disclosure of this application and is hereby incorporated by reference in its entirety.

FIELD OF THE INVENTION

This invention relates generally to an improved compression connecting device for use in securely coupling at least two objects in an assembly. In one aspect, the invention relates to the coupling of an object to a shaft or handle structure. In another aspect, the assembly provides a compression style connector for use in the attachment of grips, handles, and handle assembles to the shaft or handle portion of a tool. In an alternate aspect, a slightly modified assembly provides a compression style connector for placement on an axle shaft end for retaining an object, such as, but limited to a wheel, onto the axle shaft.

BACKGROUND

Within various industries it is necessary to assemble a product prior to use. Often, this assembly process requires the use of a fastener and/or a tool to secure the fastener between objects for a completed assembly. Typically, the objects to be assembled require some type of manufactured modification, such as, but not limited to, a tapped hole, bore, aperture, or slot(s) to accommodate the fastener and fastened object. Such exemplary industries are the agricultural, garden, snow, and maintenance industries utilizing handled tools. Generally, these tools include a working end and a handle end connected together with a shaft, rod, tubular, or other similar connecting structure. For ease in shipping, display, and adjustment, these tools are often provided unassembled or partially assembled requiring the attachment of various structures, such as, but not limited, to grips, D-handles, and handle assemblies to the connecting structure. Because of these assembly and manufacturing steps, it would be advantageous to have structures that are configured for an easier fitment to the connecting structure. Preferably, these structures enable for easy placement, adjustment, and interchangeability without the need for any pre-assembly manufacturing to enable the fastening and fitment. Still further, it would be advantageous for these structures to be manipulated and secured without the need for additional tools.

Similar to tools, these industries often also utilize objects, such as, but not limited to, carts, dollies, or wagons for the transportation of various materials. Similar to tools, these wheeled objects often also require some type of minor assembly; often this assembly is the attachment of a wheel to an axle. Generally, to enable this connection, the axle is manufactured with a hole, tapped hole, bore, aperture, or slot to accommodate a keeping element for wheel upon the axle. Because of these assembly and manufacturing steps it would be advantageous to have a structure or structures that are configured for an easier fitment to the axle for securing the wheel. Preferably, these structures enable for easy placement, adjustment, and interchangeability without the need for any pre-assembly manufacturing to enable the securing to the axle. Still further, it would be advantageous for these structures to be manipulated and secured without the need for additional tools.

There exists a need for a removable coupling device to attach various types of components to objects that can allow for interchangeability as well as minimal user skill.

BRIEF SUMMARY OF THE INVENTION

In one aspect, this disclosure is related to this disclosure is related to a method and an external compression apparatus for use in the attachment of grips, handles, and handle assemblies relative to agricultural, garden, snow, maintenance, and other common household and professional tools.

In another aspect, this disclosure is related to an apparatus to apply a compressive force between a pair of cooperating structures for securing the structures together.

In yet another aspect, this disclosure is related to an external compression apparatus for maintaining an object positioned upon an axle shaft, wherein the external compression apparatus is configured for receipt on an axle shaft end for retaining a wheel. An external compression connector for securing axle and handle parts can generally be comprised of a cavity portion in communication with the object to be secured with the cavity portion having a predetermined angular size, shape, and retaining means configured for the slidable receipt of a cooperating wedge member. The wedge member generally being placed and retained securely within the cavity for providing a compressive force within the cavity and contacting the object to be secured. The wedge member and cavity portion cooperative and angular shapes generally utilizing mechanical advantage to tightly couple the wedge member to the object though the cavity portion while also being secured within the cavity portion. Accordingly, the cavity portion can be generally integrated within a plurality of connector types for the addition of an object, such as a handle, onto a shaft or other tubular structure. The connector of the present disclosure is configured to provide a compressive force to a plurality of objects and will work with round, square, oval, and other common shapes and multiple material types including, but not limited to, metals, plastic, and wood.

In another aspect, the present disclosure relates to a compression device for mounting a housing to an object. The compression device can include a housing member that can have a first cavity that a portion of an object can be positioned within the cavity. The cavity shape can approximate the shape of the object and mounting surface of the object. A portion of the housing cavity can have an open end, a fixed end, and an angular surface. The device can further include a wedge member that can have a leading edge, a trailing edge, first surface and a second surface, wherein the first surface is configured to engage the object and the second surface that is configured to slide along the angular portion of the cavity, wherein at least a portion wedge member is configured to be positioned within the cavity. The second surface can have a similarly corresponding angular orientation that corresponds to the angular orientation of the cavity. A fastener can be included to bias the wedge member within the cavity between a plurality of positions. The fastener can be removably coupled to a portion of the housing, to a portion of the wedge member, or both. The fastener can be further configured to bias the wedge member between a first position to a second position, wherein the wedge member exerts a compressive force against the mounting surface of the object when positioned at the second position.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1A:
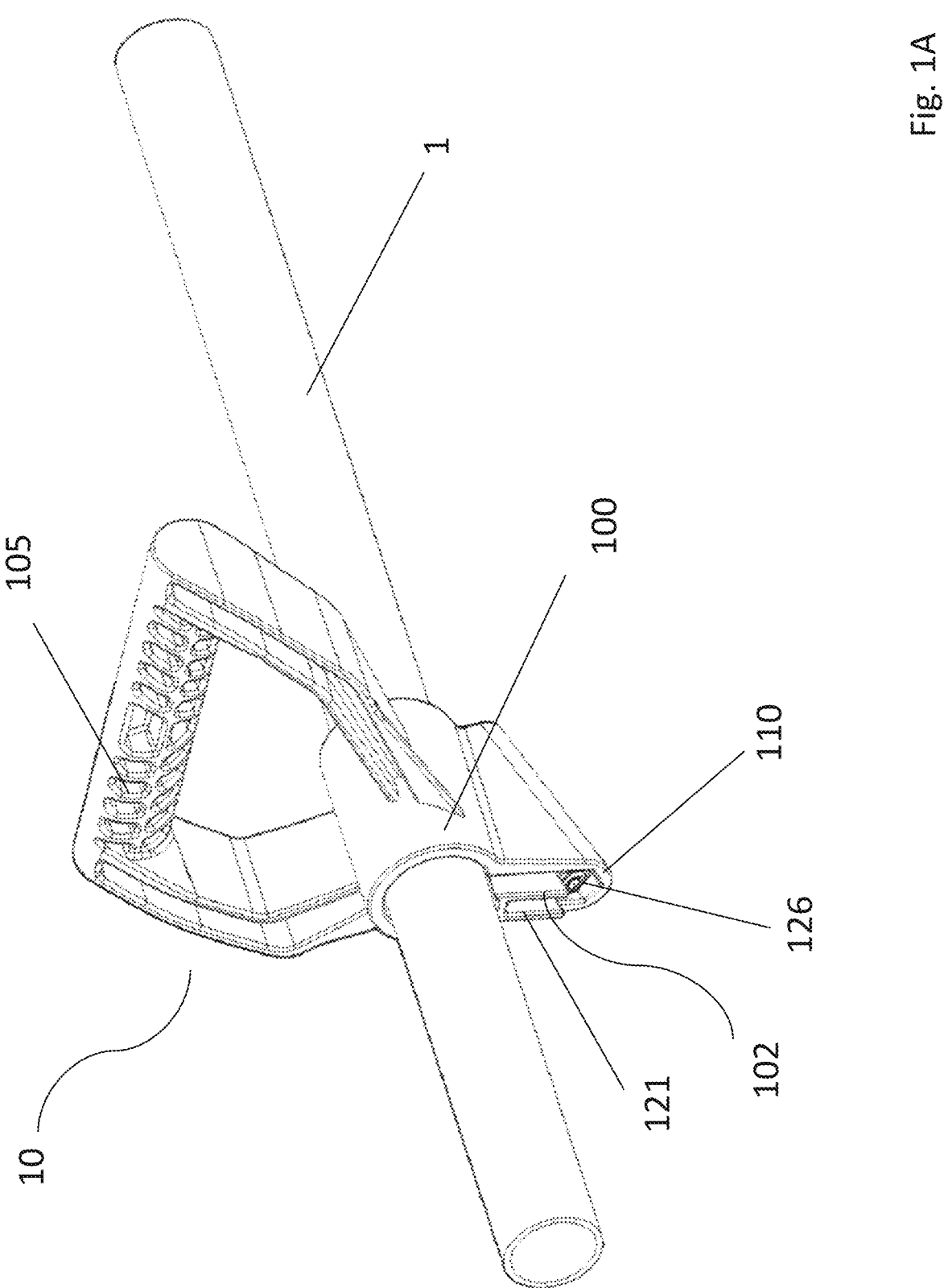
FIG. 1A is a perspective view of an external compression connector apparatus of the present disclosure integrated into a handle and received on a tubular mounting surface.
Figure 1B:
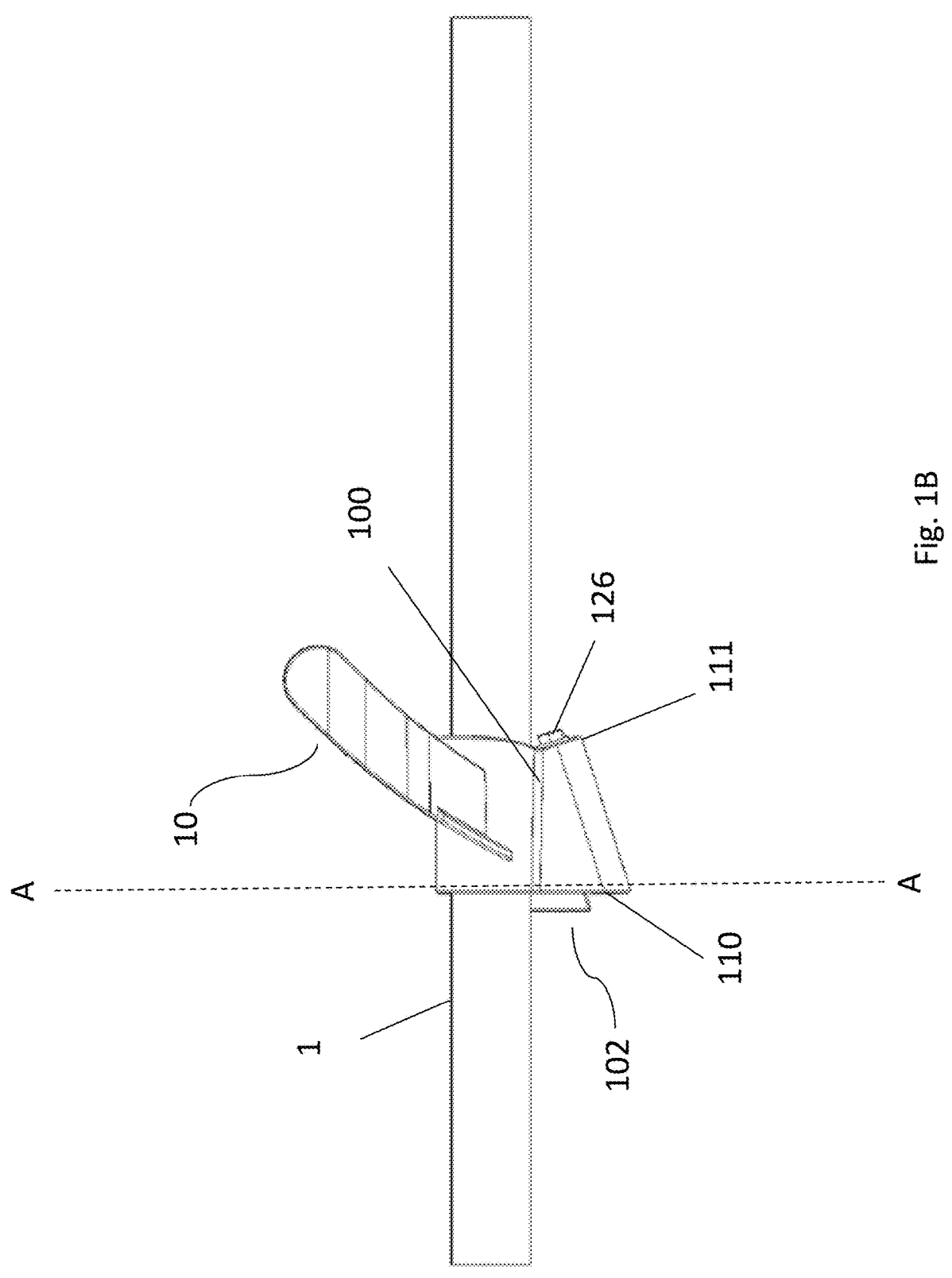
FIG. 1B is a side view of an external compression connector apparatus of the present disclosure integrated into a handle and received on a tubular mounting surface.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, such as a metallic wire, wireless network, optical fiber, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring to FIGS. 1-4, an external compression connector apparatus 10 for securing axle and handle parts is generally referred to herein as device 10. An exemplary embodiment of the device 10 can include a housing 100 generally providing a main structure 105 that can be molded to a variety of shapes and structures. As shown in FIGS. 1-4, a housing 100 can be integrated directly into a handle, knob, or other similar grasping structure configured for attachment to a mounting surface 1 including but not limited to a cylindrical handle, rail, bar, shaft, rod, axel or other similar mounting surface. The handle portion 105 can take any suitable shape and be molded into or removably couplable to the housing 100. FIGS. 3-4 provide a housing 100 that can be integrated directly into a clamp member for a mounting surface 1 that can be an axle 3. The axel 3 can have a first end and a second end. The housing member 100 can be received on an end of the axle 3 for retaining a wheel, plate, washer, or any other device that may need to be secured to the end of the axle. The housing member 100 can also function as a stop to prevent an item from being removed from an axle or mounting surface 1.

In one exemplary embodiment, the device 10 can most generally be configured as feature that can be directly integrated into existing devices through the addition of the cavity 101 to a variety of housing 100 shapes, wherein the cavity 101 shape can be created within a molded assembly and with introduction of the wedge member 102 into the cavity 101 secure this molded assembly directly to the desired mounting surface 1. Accordingly, the device 10 can be configured to provide a compressive force to a plurality of objects 1 and will work with round, square, oval, and other common shapes and multiple material types including, but not limited to, metals, plastic, and wood.

Referring now to FIG. 1A-E, an exemplary embodiment of the compression connector apparatus 10 of the present disclosure can be coupled to a mounting surface. The various housing 100 shapes include a cavity portion 101 generally defining an opening for the receipt of a wedge member 102 within the cavity portion 101 for removably coupling the housing 100 to a selected mounting structure 1. The cavity 101 can have a predetermined angular size generally defined by an open end 110 culminating in a fixed end 111, with the fixed end 111 generally closer in adjacency relative to an edge of the mounting structure. A cavity 101 can include a sidewall 150.

Figure 1C:
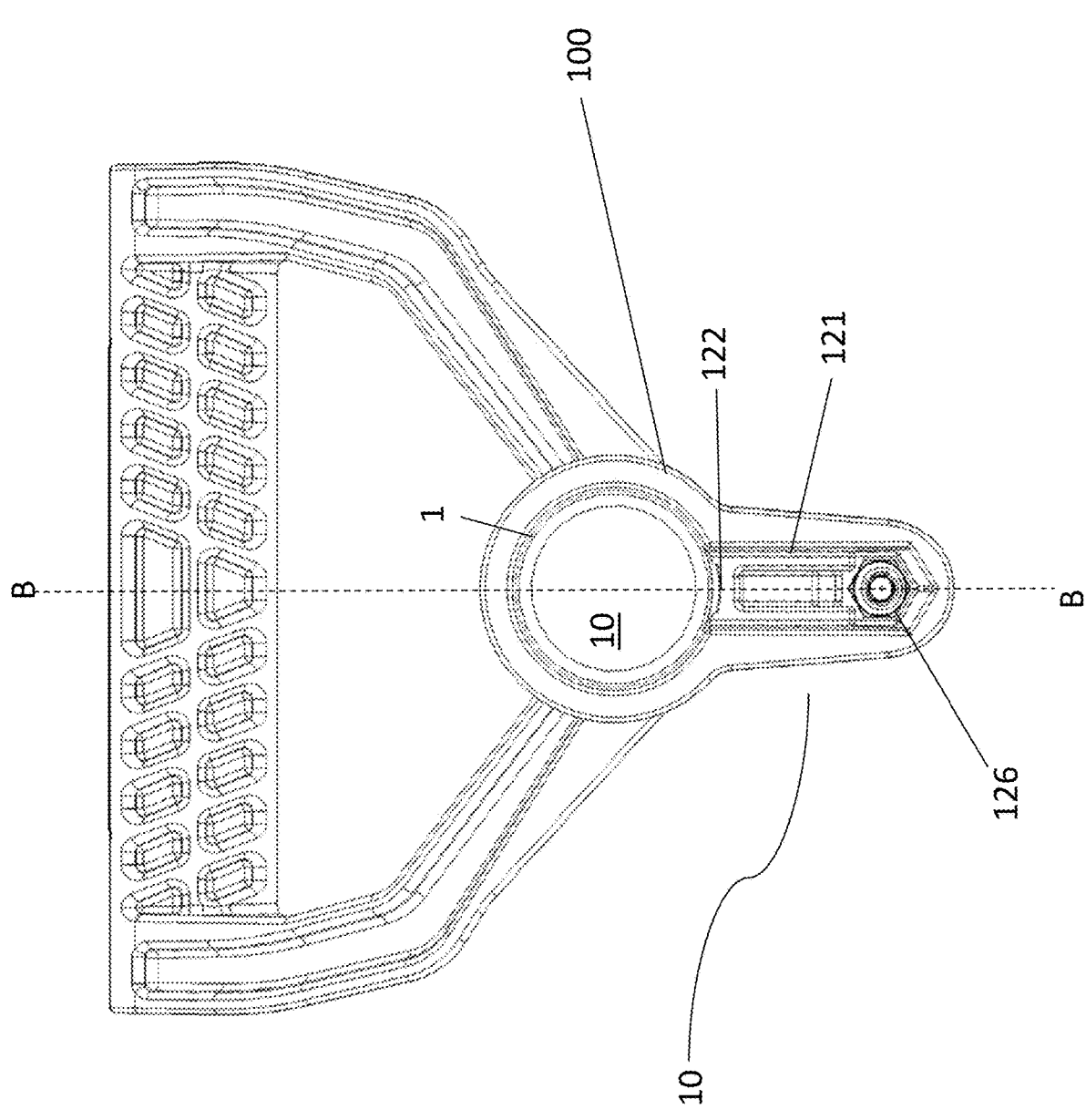
FIG. 1C is a cross-section view along axis A-A of an external compression connector apparatus of the present disclosure integrated into a handle and received on a tubular mounting surface.
Figure 1D:
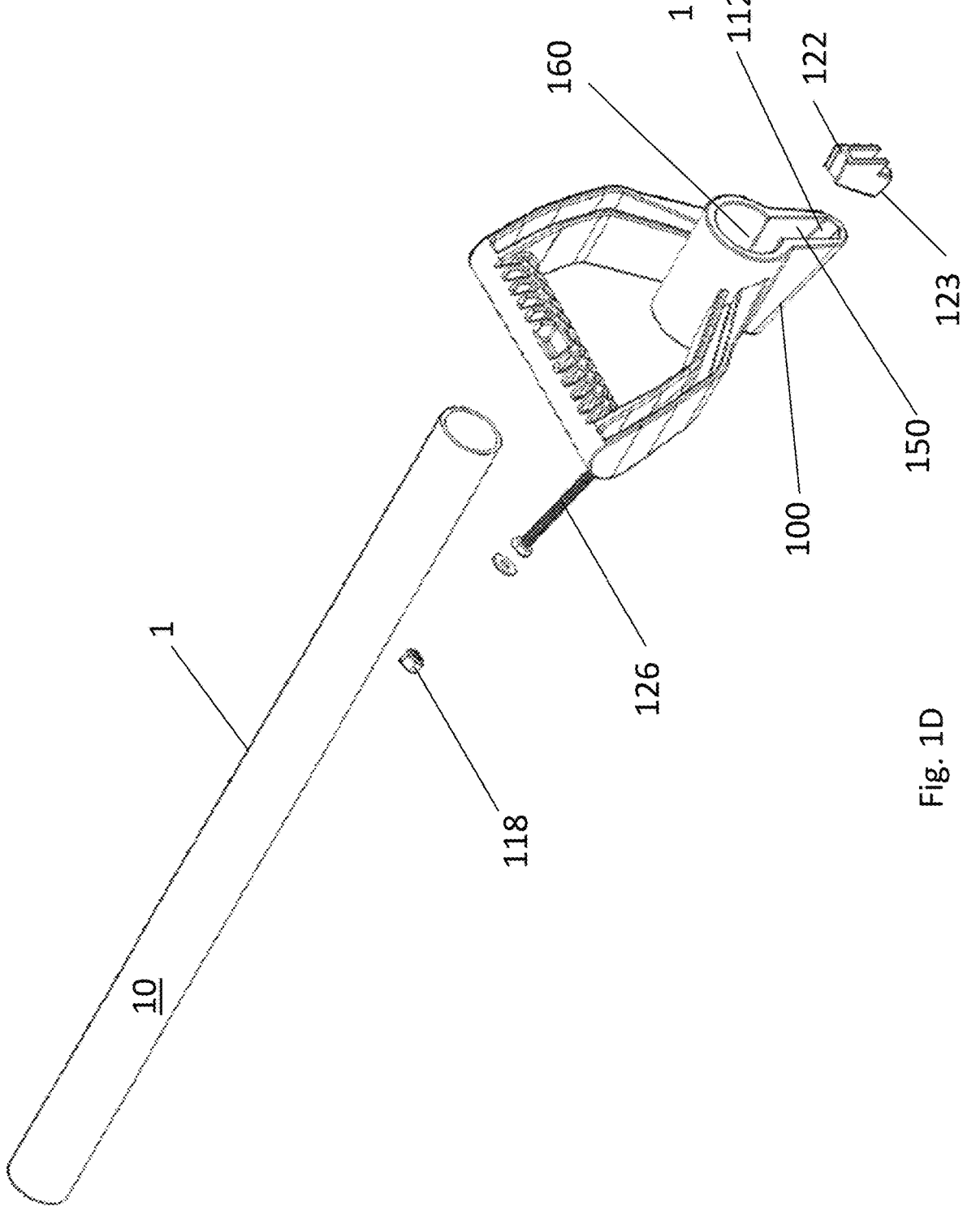
FIG. 1D is an exploded view of an external compression connector apparatus of the present disclosure integrated into a handle and received on a tubular mounting surface.
Figure 1E:
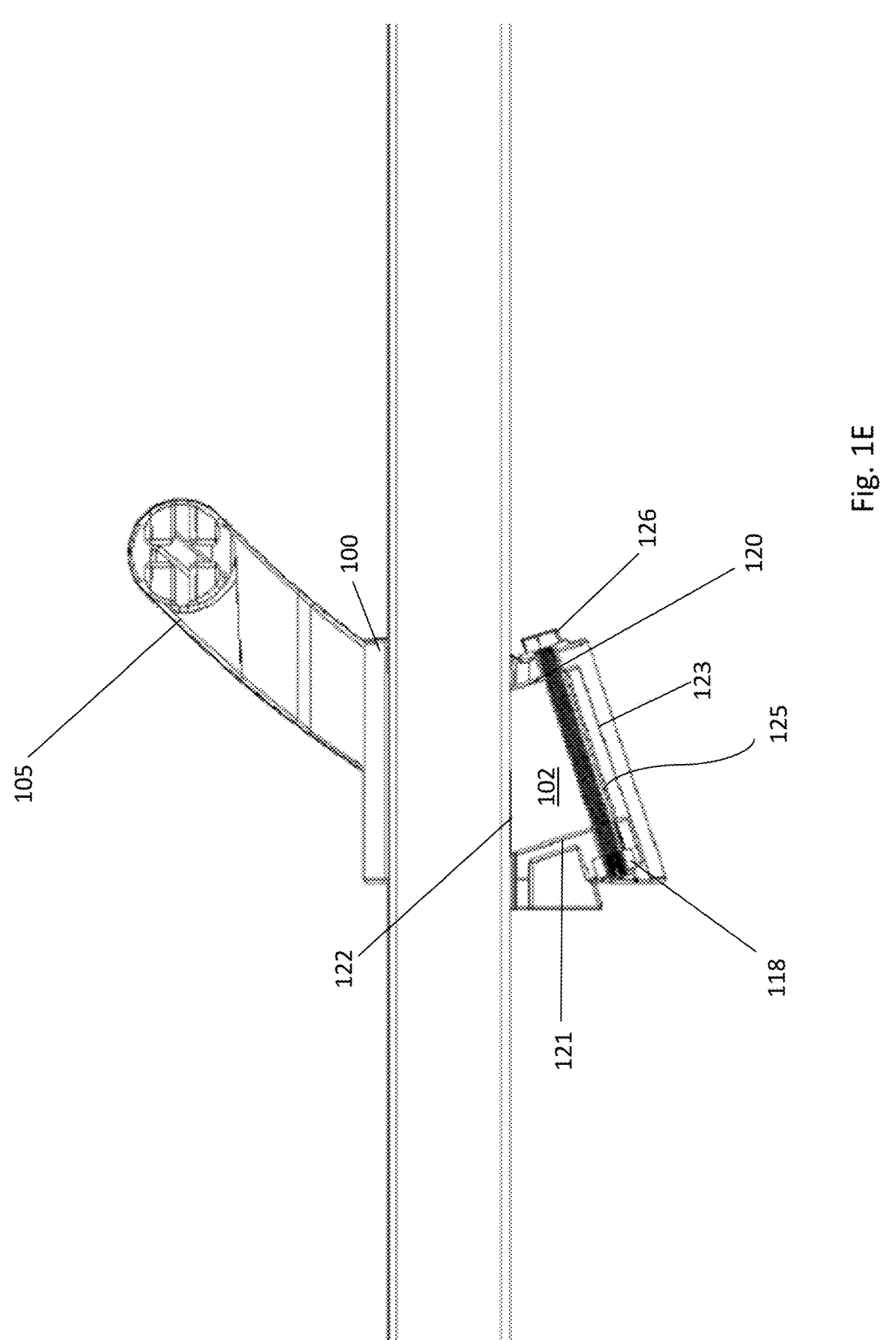
FIG. 1E is a cross-section view along axis B-B of an external compression connector apparatus of the present disclosure integrated into a handle and received on a tubular mounting surface.

A portion of the sidewall 150 can include an angular portion 112. The angular portion 112 can be positioned on a lower portion of the cavity 101 relative to the mounting structure 100. The angular portion 112 can be configured to direct, keep, and provide a fixed surface directing a wedge member 102 in a secure abutment against the mounting surface 1 for retaining the housing 100 securely to the mounting surface 1. The angular portion 112 can generally being ramp-like and providing a mechanical advantage relative to the receipt of the wedge member 102. The angular portion 112 can be formed at an angle with respect to the plane of the mounting surface 1. As the wedge member 102 is driven further into the cavity a greater compressive force can be applied against the mounting surface 1 by the first surface 122 of the wedge member 102. The housing 100 can additionally have a separate or adjoined aperture 160 to accept a portion of the mounting surface 102. In some exemplary embodiments, an aperture 160 can allow the mounting surface 102 to completely pass through the housing 100 as shown in FIGS. 1-2. In other embodiments, the aperture 160 for only a portion of the mounting surface to pass through and into the housing 100, as shown in FIGS. 3-4. As shown in FIG. 1D the cavity 101 and the aperture 160 can be adjacent to each other or alternatively separate as shown in FIG. 2F.

Figure 3A:
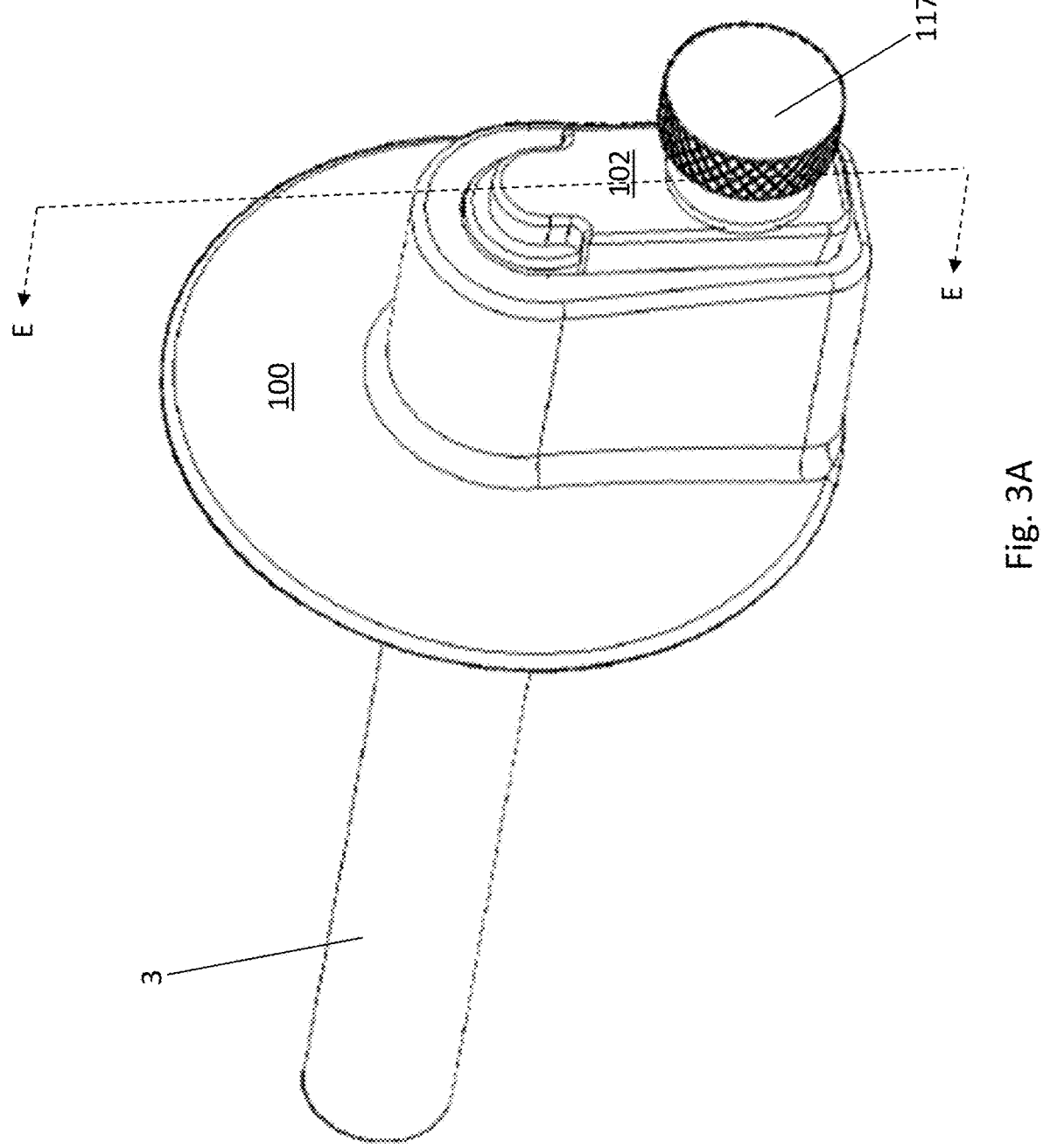
FIG. 3A is a perspective view of an exemplary embodiment of an external compression connector device of the present disclosure integrated into an axle clamp and received on an end of an axle shaft.
Figure 3B:
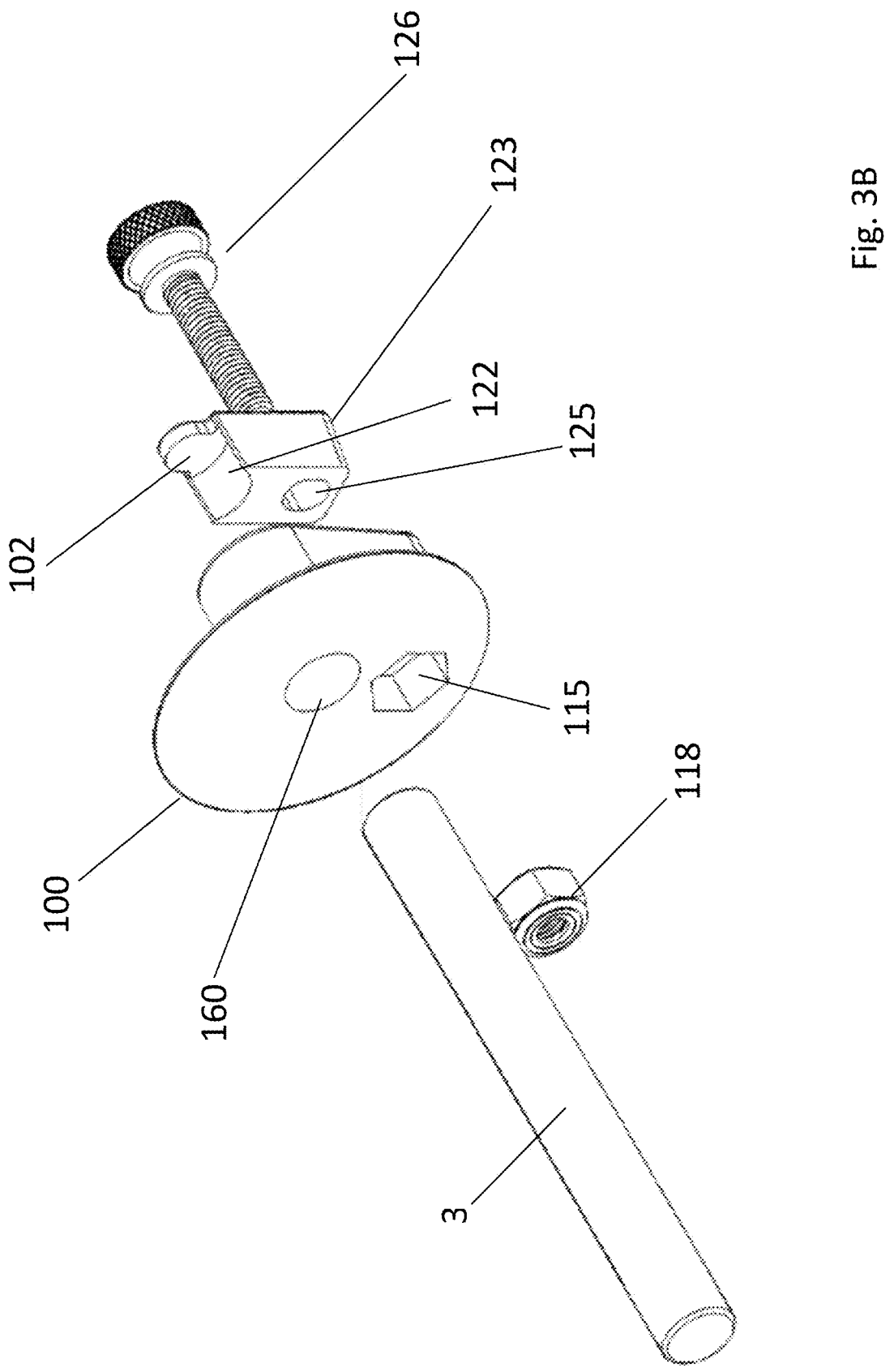
FIG. 3B is a first isometric exploded view of an exemplary embodiment of an external compression connector device of the present disclosure integrated into an axle clamp and received on an end of an axle shaft.

A first surface 122 of the wedge member 102 within the device 10 can be configured to contact and engage a mounting surface 1 as the wedge member 102 can be securely advanced into the cavity 101. As the wedge member 102 is further advanced into the cavity 101 a greater compressive force can be exerted between the first surface 122 and the mounting surface 1. Accordingly, the first surface 122 may include additional shaping or features to better engage the mounting surface securely. As is shown in FIGS. 1C-1D and FIG. 3B, a first surface 122 can be provided with a generally arcuate or curved shape to specifically engage a tubular/shaft diameters type of mounting surface the device 10 can be used upon.

Figure 2A:
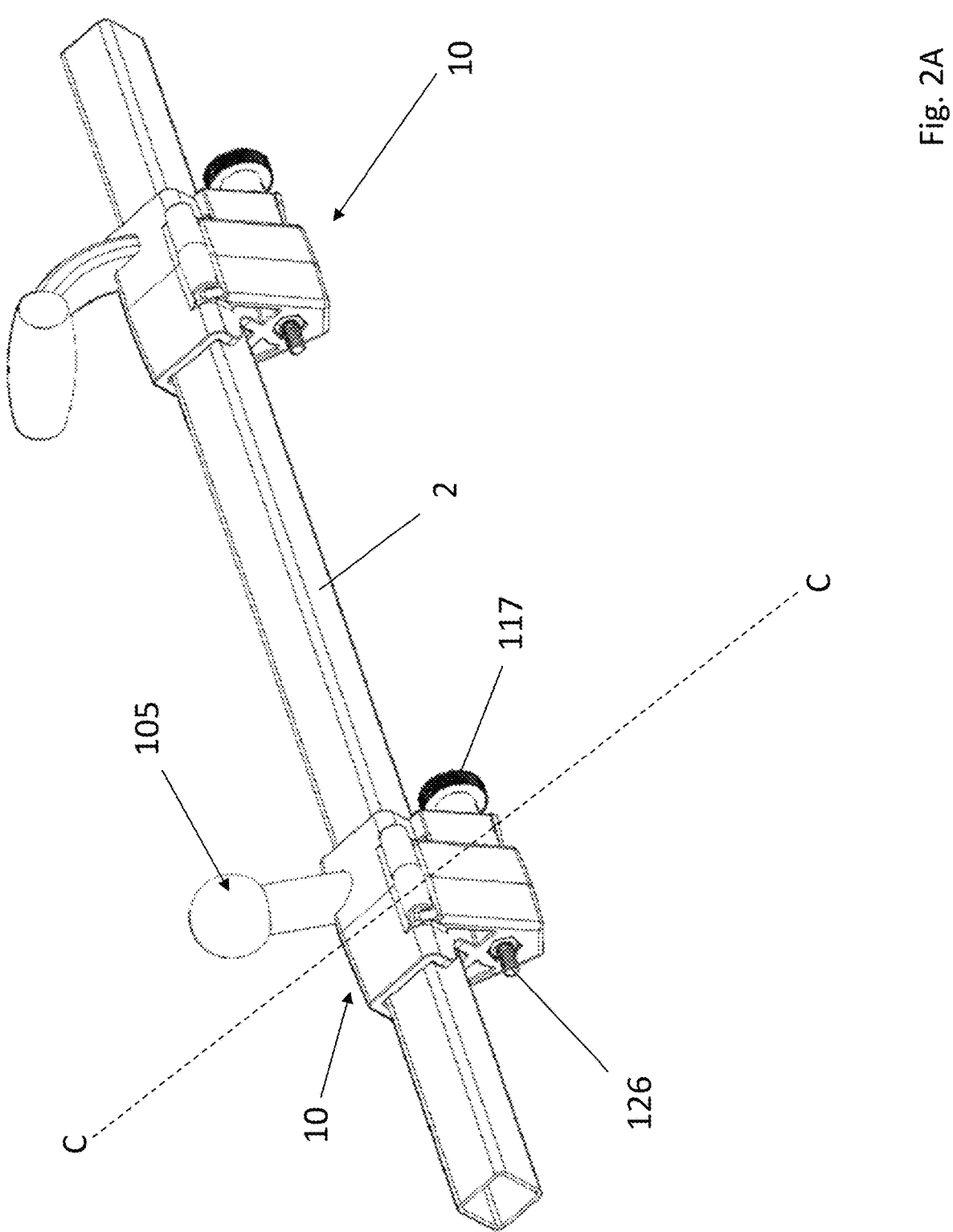
FIG. 2A is an isometric view of a pair of the external compression connector devices of the present disclosure integrated into a handle and a knob and received on a square tubular mounting surface.
Figure 2B:
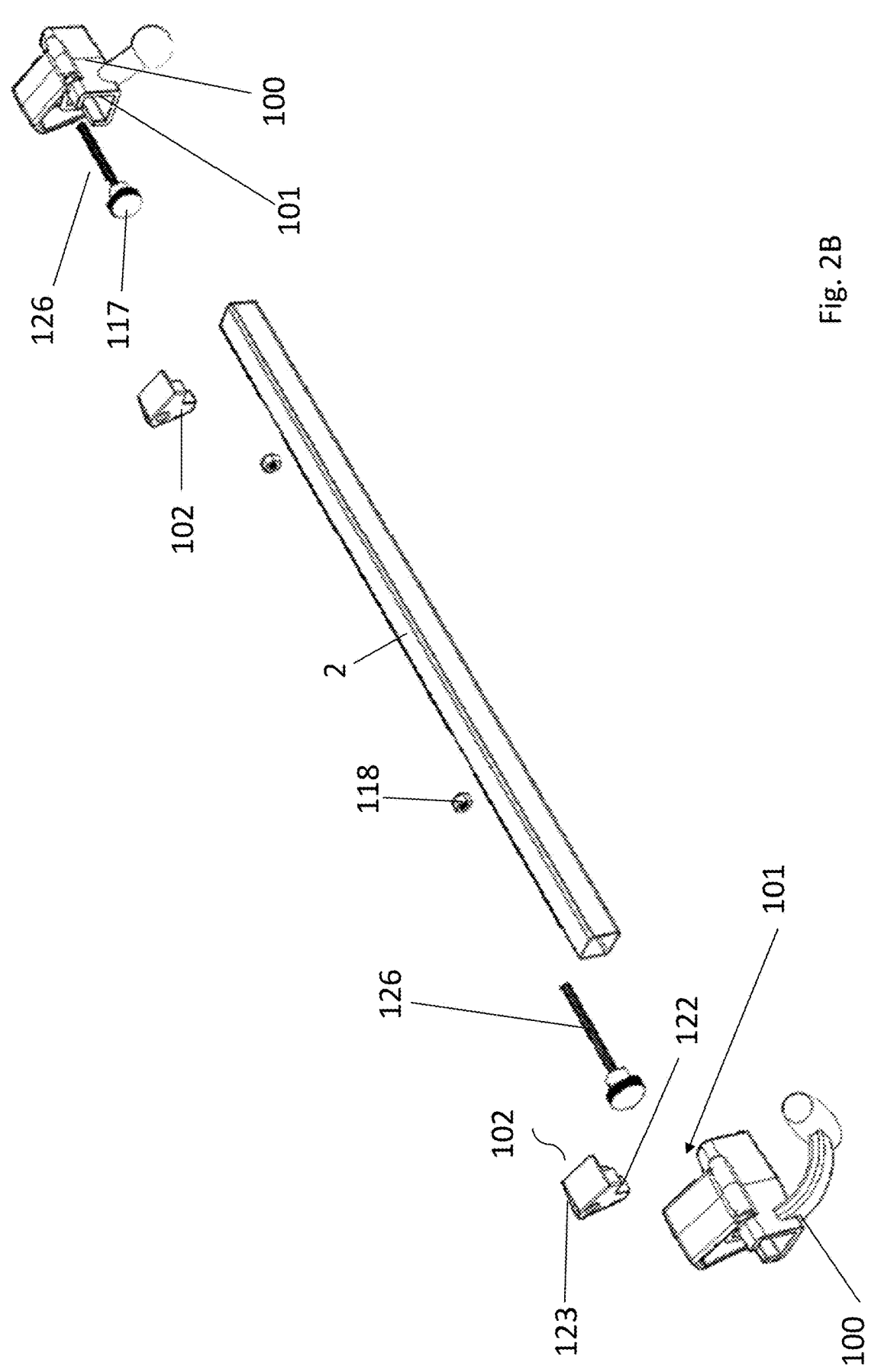
FIG. 2B is an isometric exploded view of the pair of the external compression connector devices of the present disclosure integrated into a handle and a knob and received on a square tubular mounting surface.
Figure 2C:
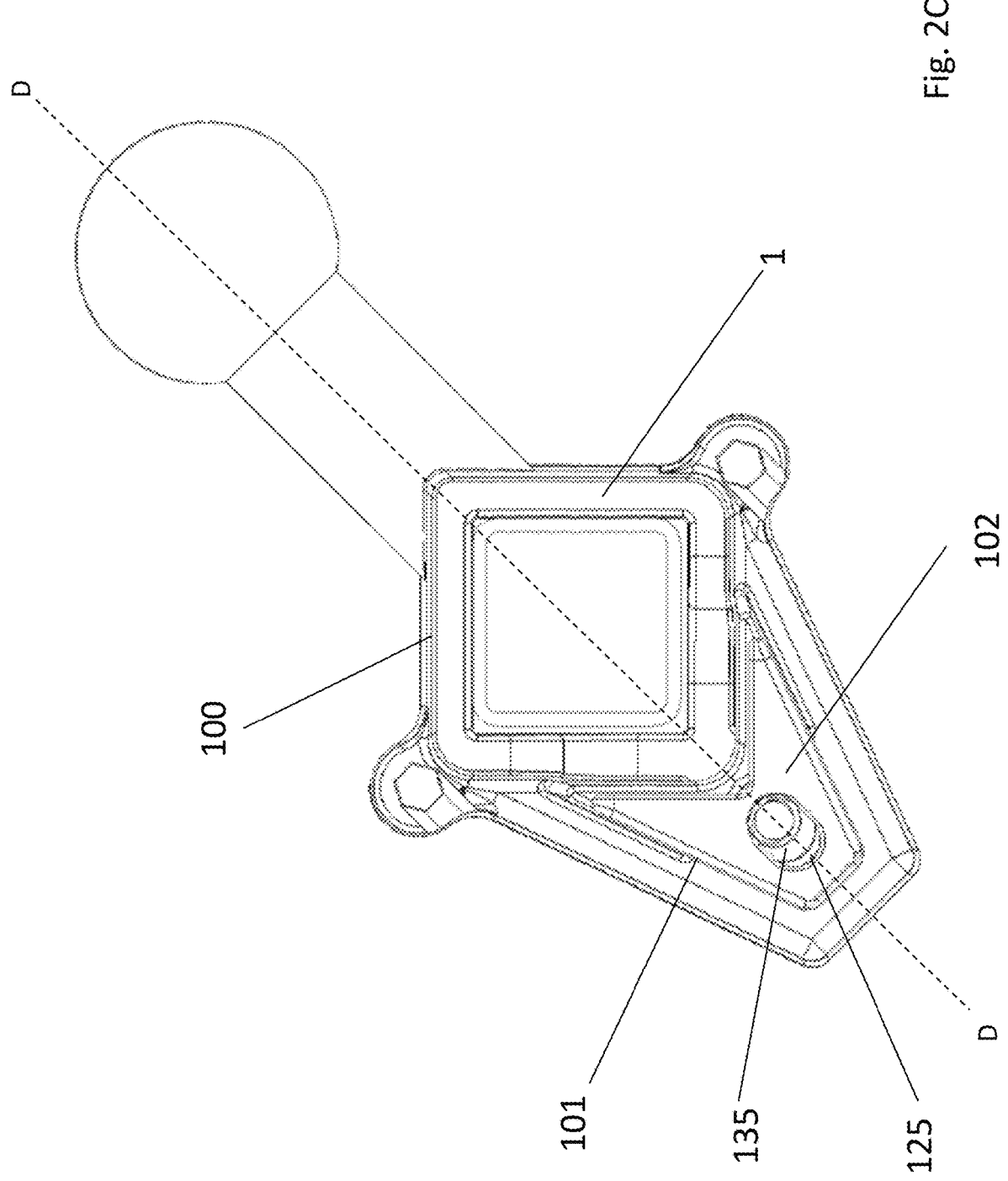
FIG. 2C is a cross-sectional view along axis C-C of an external compression connector devices of the present disclosure integrated into a knob and received on a square tubular mounting surface.
Figures 2D, 2E:
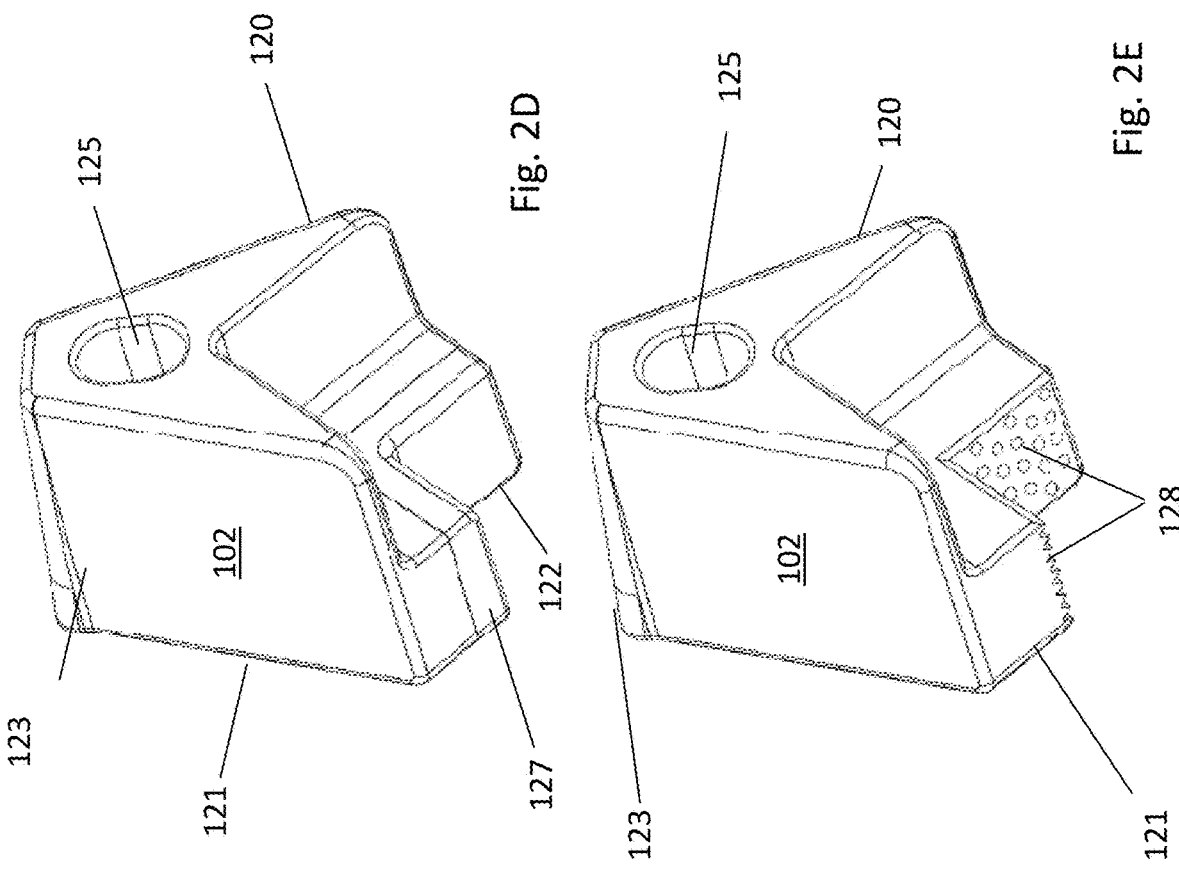
FIG. 2D is an isometric view of an exemplary embodiment of a compression wedge element having an overmolded gripping surface.
FIG. 2E is an isometric view of an exemplary embodiment of a compression wedge element having a rigid engaging member surface.
Figure 2F:
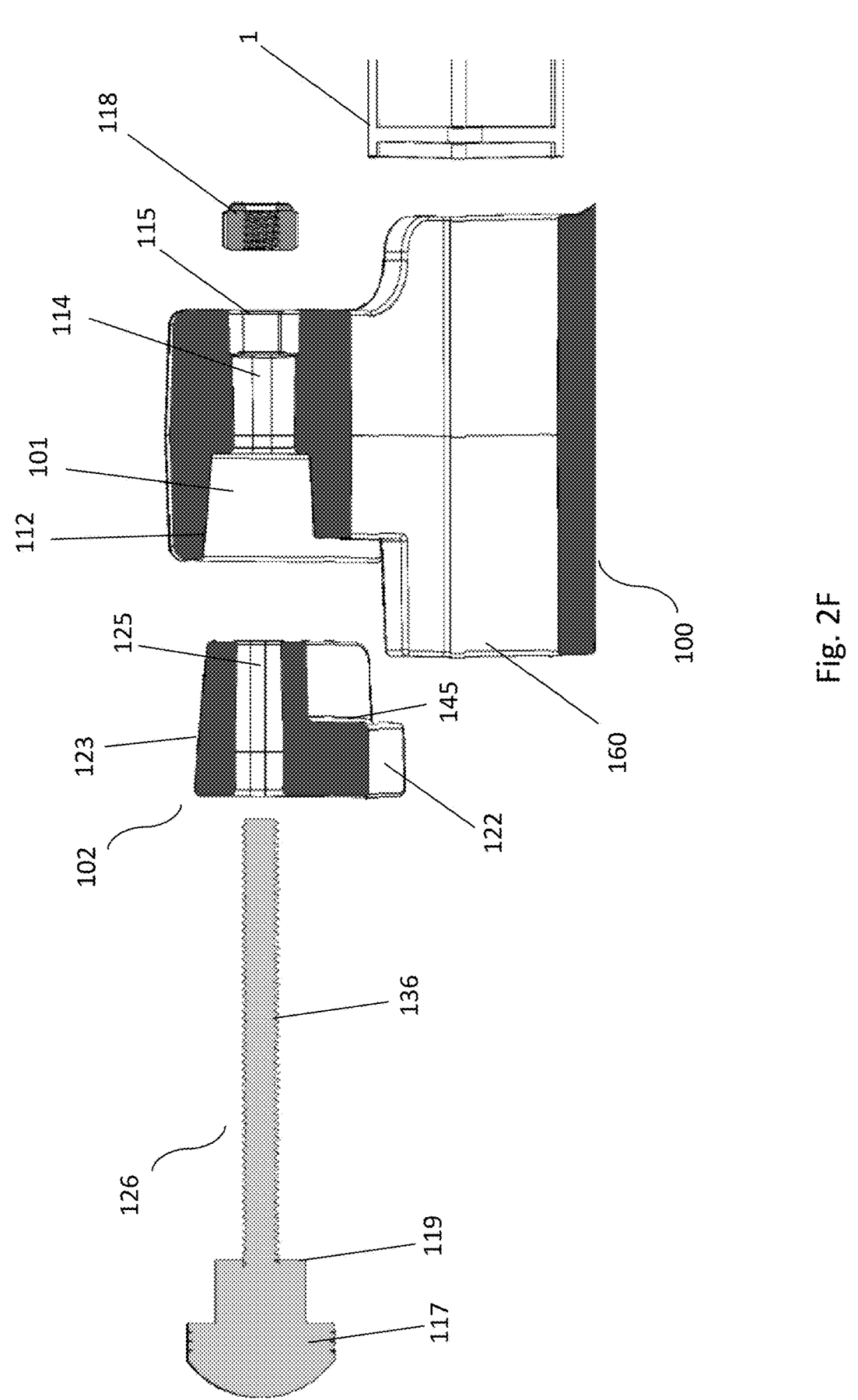
FIG. 2F is a side exploded cross-sectional view along axis D-D of an external compression connector devices of the present disclosure integrated into a knob and received on a square tubular mounting surface.

As shown in FIGS. 2A-2G, this first surface 122 can be provided in a generally L-shaped or V-shaped notch to specifically engage the square tubular bar mounting surface 1. In some exemplary embodiments the first surface can have additional components integrated onto the surface or coupled to the surface. FIG. 2D provides a wedge member 102 having a seal member 127. The seal member 127 can be formed on the first surface 122 of the wedge member 102. In some exemplary embodiments, the seal member 127 can be over molded to the surface of the wedge member 102. The seal member 127 can be comprised of any suitable material including a polymer, rubber, thermoplastic or other material that can provide a grip against the mounting surface 1. The seal member 127 can have a first durometer and the wedge member 102 can have a second durometer. In some exemplary embodiments, the first durometer and the second durometer can be the same. In other embodiments, the first durometer and second durometer can be different. In one exemplary embodiment, the first durometer can have a value less than the second durometer. The seal member 127 durometer can be any suitable Shore to provide a greater seal or friction against the mounting surface 1 of the object.

In other exemplary embodiments, the first surface 122 can have grooves or engaging members 128. The engaging member 128 can provide additional grip or friction to further engage the mounting surface 1. In some exemplary embodiments, the engaging member 128 can protrude into the surface of the mounting surface 1. In various embodiments, the seal member 127 can additionally include engaging member(s) 128 to provide further grip against the mounting surface 1.

Figure 2G:
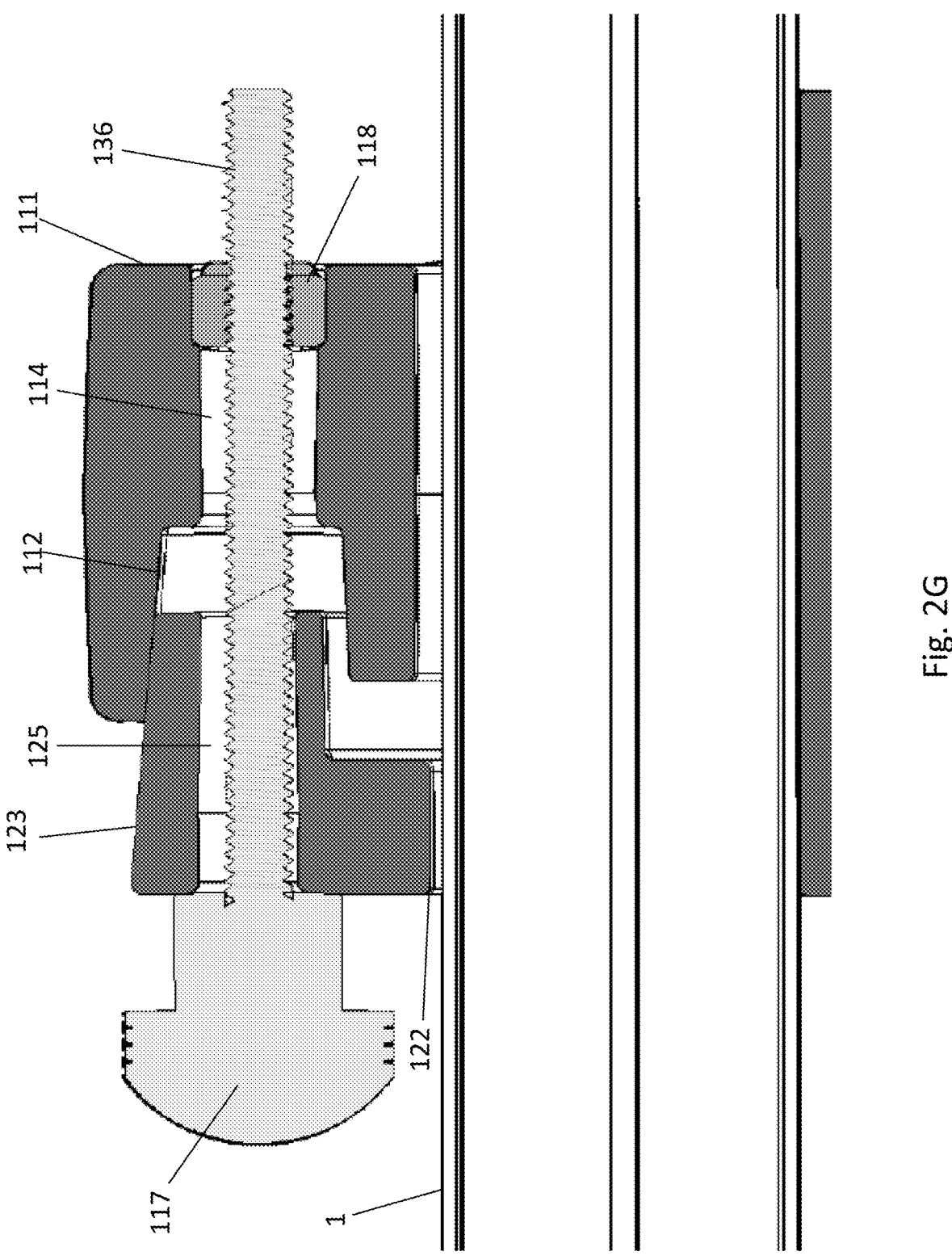
FIG. 2G is a side cross-sectional view along axis D-D of an external compression connector devices of the present disclosure integrated into a knob and received on a square tubular mounting surface.

FIGS. 2F-2G shown an exemplary embodiment of the compression coupling device of the present disclosure. FIG. 2F illustrates the various components of an exemplary embodiment of a device having a coupling or biasing means 126 such as a fastener and a nut 118. The housing can include a first aperture 114 to receive the fastener 126. A wedge member 102 can be configured to fit at least partially within a cavity 112 of the housing 100. The wedge member 102 can have a through hole or aperture 125 to allow for the fastener 126 to pass through the lip 119 of the knob 117 can engage with a side or face of the wedge member 126 as it is being tightened against the surface 1 of the object. The object can pass through the through hole 101 of the housing 100. The housing can similarly include a formed cavity 115 to house a nut 118 or other fastening means. Alternatively, the cavity portion can be threaded to engage the threaded portion 126 of the fastener 126. The first surface 122 of the wedge member can interface with the mounting surface 1 to maintain the housing 100 onto the object 1.

A fixed end 111 of the housing can include a first aperture 114 configured as means for biasing the wedge member 102 or for securing a fastener 126 that may be provided in redundancy or alone to secure the wedge member 102 within the cavity 101 of the housing. A biasing means/fastener 126 can pass through the aperture 114 and couple directly to the wedge 102 or alternatively use a nut 118 or other apparatus to the wedge member 102. In some exemplary embodiment, the fastener 126 can be a screw or threaded bolt and the wedge member 102 can have a threaded aperture to allow the fastener to be removably coupled.

In some exemplary embodiments, the aperture 114 can have a threading surface formed within the cavity 115 instead of a nut 118 for coupling to the fastener 126. The first end of the fastener can have a knob or grip portion 117 that can allow a user to easily turn the fastener. In some exemplary embodiments, the fastener 126 can have a threaded end 136. The second end can have optional threading for securing the fastener to a nut 118, a threaded housing portion, and/or a threaded aperture of the wedge member 102. The grip portion 117 can also have a flat surface 119 extending generally perpendicular from the second end of the fastener and contact the wedge member 123 or housing 100 when biasing the wedge member against the mounting surface 1 of an object 10.

In the shown assemblies, the cavity 115 can be configured to receive a nut 118 with a size corresponding to the securing fastener 126, wherein the securing fastener 126 is configured to bias the wedge member 102 into the cavity portion 101 and securing the wedge member 102 against the mounting structure. Alternate to a nut 118 or other securing means, the aperture 114 or additionally the cavity 115 may be a tapped bore or some other means to quickly and securely the fastener 126. In other exemplary embodiments, the aperture 114 can have a threaded portion to allow for a threaded fastener to engage and move the wedge member 102 within the housing 100 and apply a compressive force against the surface 1. In some other exemplary embodiments, the through hole 125 can additionally have threaded interior wall 135 that can interface with a threaded fastener 126 to allow for the fastener to further drive the wedge member 102 against the surface 1. In these embodiments, a nut 118 or securing member can be optionally used to further secure the fastener 126 or act as a secondary means to secure the biasing means.

A wedge member 102 can generally have a predetermined shape corresponding to the shape of the wedge cavity 101, wherein the wedge member 102 is configured for receipt within the cavity 101 in a secure engagement. In one exemplary embodiment of the assembly, a wedge member 102 is slidably received within the cavity 101 and may be provided in a preassembled position with the wedge member 102 in a generally loosened position relative to the mounting surface 100. A wedge member 102 can have first end a second end and can be angular shape generally defined by a leading side or edge 120, a trailing side or edge 121 opposed the leading side 120, a first surface 122, and a second surface 123 with the first surface 122 and the second surface 123 connecting the leading side 120 and trailing side 121 in generally cohesive wedge-like shape. In some exemplary embodiments, the leading side 120 can have a length less than that of the trailing side 121. In some exemplary embodiment, only a portion of the wedge member 102 may fit within the cavity 101 of the housing. As shown in FIG. 2G only the leading portion of the wedge member can be configured to fit within the cavity 101. The wedge member 102 can similarly form a ledge 145 that can act as a final position stop for the wedge member within the cavity 101.

In some exemplary embodiments, the second surface 123 can have a corresponding angular orientation to that of the angular portion 112 of the cavity. The leading edge 120 having a height defined by the distance between the first surface 122 and the second surface 122 along the leading edge 120. In some exemplary embodiments, the trailing edge 121 can have a height defined by the distance between the first surface 122 and the second surface 122, wherein this height of the trailing edge 121 is greater in length than the height of the leading edge 120 distance to form the angular shape of the wedge member 102. During use of the device 10, a wedge member 102 can be received within the cavity 101 with the leading edge 120 first to utilize the mechanical advantage of the corresponding angular and ramp-like surfaces. The second surface 123 can be configured to engage with the angular portion 112 and is generally a lower edge of the wedge member 102 relative to the mounting surface.

As a fastener or biasing means 126 can be turned or tightened, the wedge member 102 can be moved between a plurality of positions such as between a first position to a second position. The wedge member 102 can be moved further into the wedge cavity 101 of the housing 100. As the wedge member 102 is moved into the wedge cavity 101, the angular portion 123 of the wedge member 102 can interface with the angular portion 112 of the cavity causing the wedge member to move generally in an opposing direction of the angular portion 112 of the cavity and apply compression against the object within the mounting cavity 160 of the housing 100. The further the wedge member 102 is moved within the cavity 101 the greater the compressive force is applied to the object 1 within the mounting cavity 160.

FIGS. 3-4 provide exemplary embodiments of a compression connector device of the present disclosure that can be used at the end of an axel rather than for a pass-through object 1 as shown in FIG. 1-2. The various components can be generally similar and can allow for the compression device 10 to be coupled at the end of an object 1 such as an axel 3. The device 10 can include a housing portion 100 and a wedge member 102. A coupling means 126 such as a fastener can be used to removably couple the housing 100 and wedge member 102 using a compressive force between the wedge member 102 and the object surface 1. The housing can have an angular surface 112 that can interface with the angular surface 123 of the wedge member 123. A nut 118 can be used to interface with a threaded end 136 of a fastener 126 to tighten or loosen the fastening means, which can in turn add or release the compressive force applied by the wedge member 102 to the mounting surface 1. The housing can include a cavity 115 that can approximate a nut or other fastening device. In some exemplary embodiments, the cavity 115 can house at least a portion of the nut 118. In other exemplary embodiments, the cavity can be configured to include threading to interface directly with the threaded portion of a fastener 126.

Figure 3C:
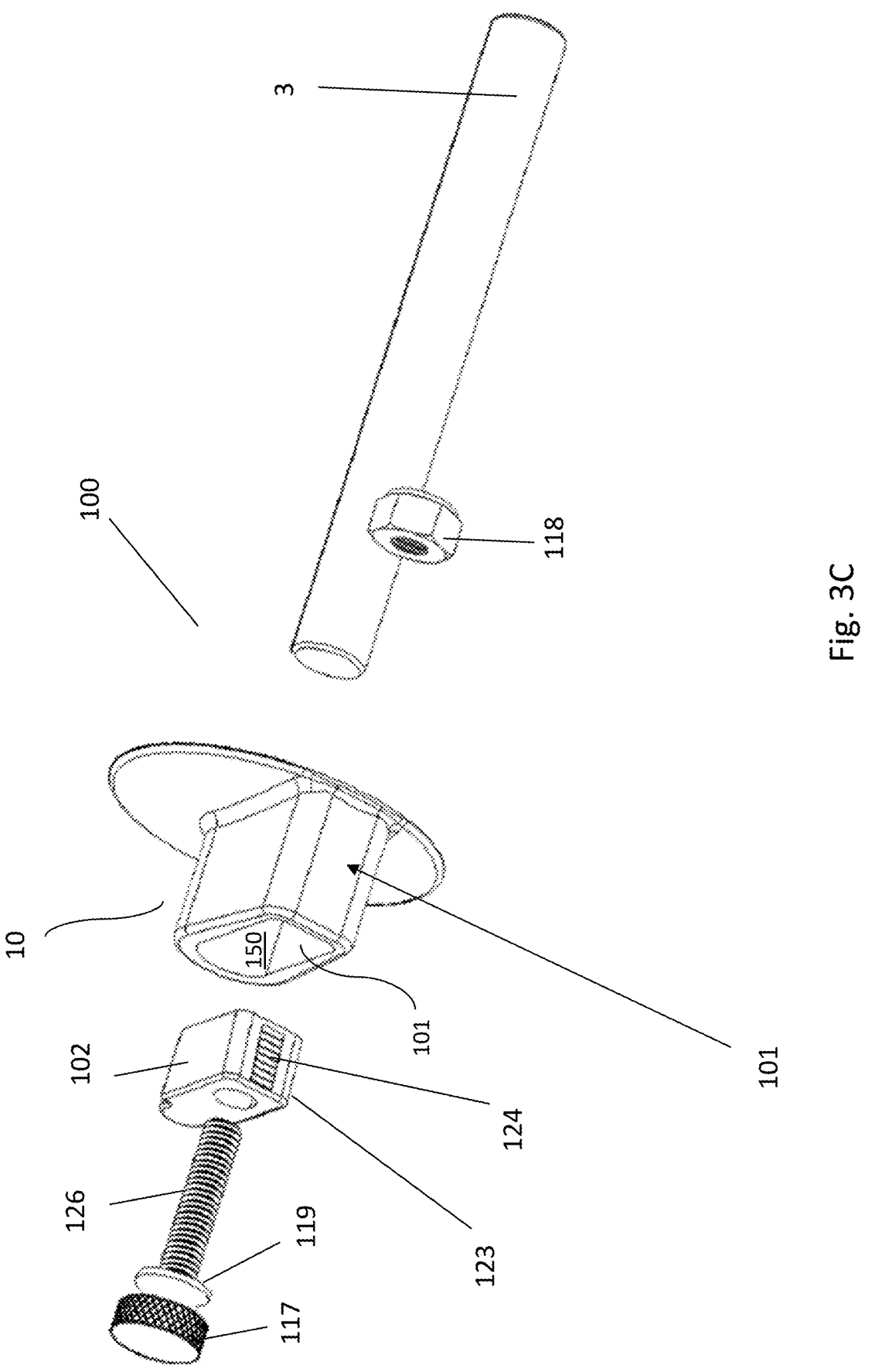
FIG. 3C is a second isometric exploded view of the external compression connector device of the present disclosure integrated into an axle clamp and received on an end of an axle shaft.
Figure 3D:
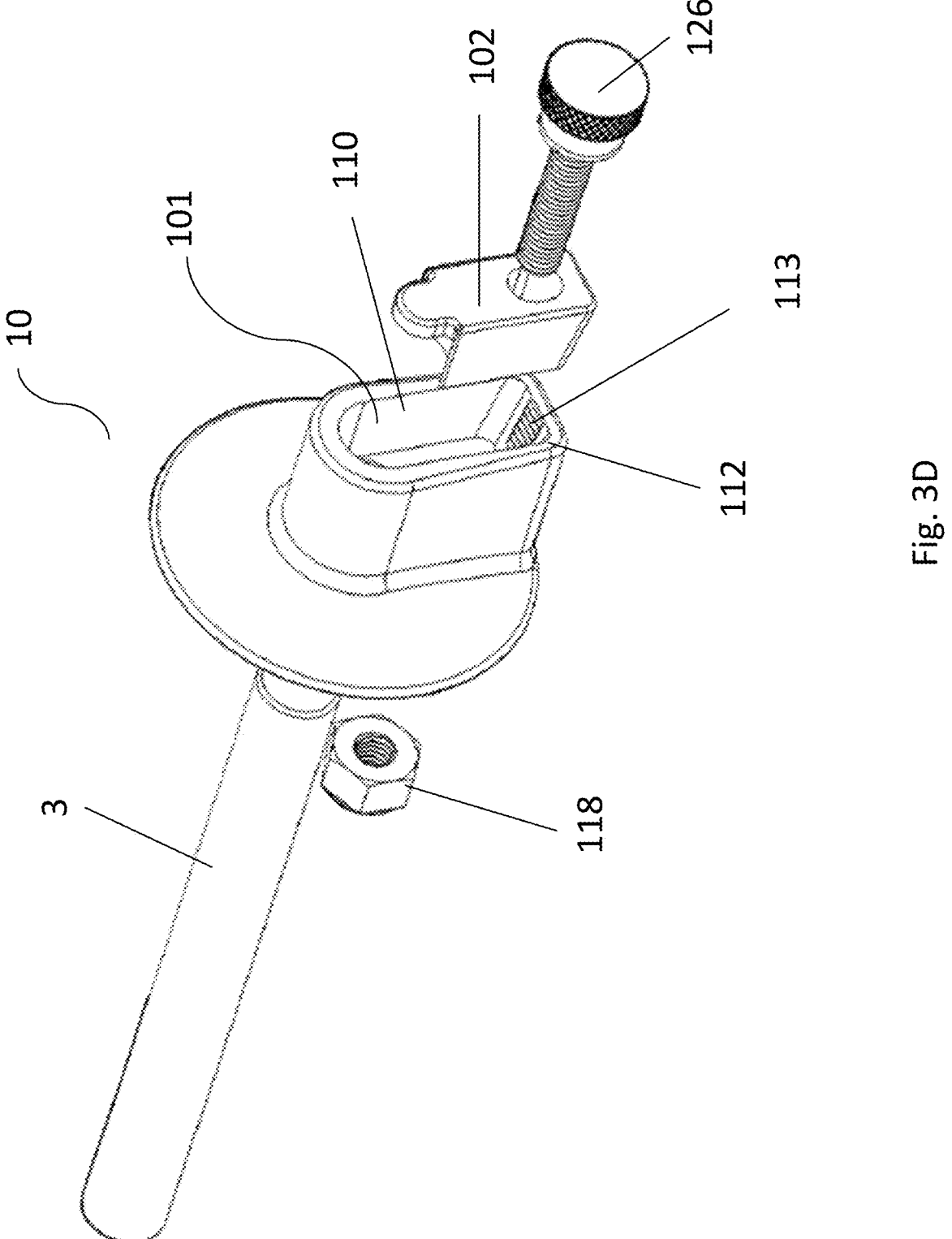
FIG. 3D is a third isometric exploded view of an exemplary embodiment of an external compression connector device of the present disclosure integrated into an axle clamp and received on an end of an axle shaft.
Figure 3E:
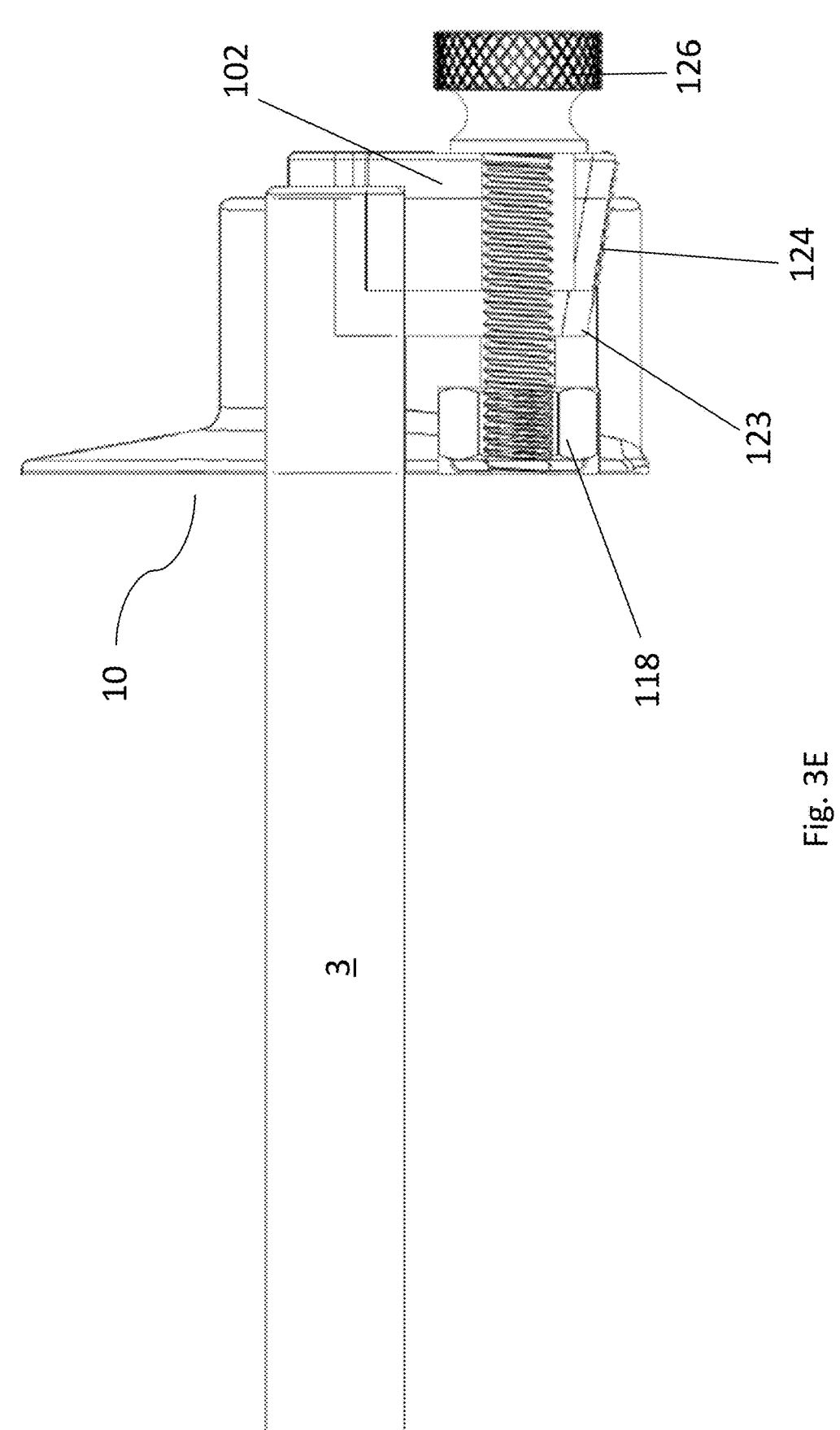
FIG. 3E is a side cross-sectional view along axis E-E of an exemplary embodiment of an external compression connector device of the present disclosure integrated into an axle clamp and received on an end of an axle shaft.

As shown in FIG. 3D, the angular portion 112 generally representing a floor of the cavity 100 can optionally include a plurality of raised surfaces generally forming a first plurality of grooves 113 configured to engage a cooperating and corresponding surface on the wedge member 102. Accordingly, the first plurality of grooves 113 may be angled directionally corresponding to the angular portion 112, wherein this plurality of grooves 113 provide a securing mechanism within the cavity 100 relative to the wedge member 102.

The second surface 123, similar to the angular portion 112 of the cavity 101 can optionally include a plurality of raised surfaces generally forming a second plurality of grooves 124 configured to engage the cooperating and corresponding angular portion 112. Accordingly, the plurality of grooves 124 may be angled directionally corresponding to the angular shape of the second surface 123, wherein this second plurality of grooves 124 provide a cooperating securing mechanism within the cavity 101 relative to the housing 100.

Accordingly, both of the plurality of grooves 113, 124 are configured to perform similar to a traditional cable-tie or zip-tie as they are commonly referred for securing the wedge member 102 within cavity 101 as shown in FIG. 3C-3D. As the fastener 126 biases the wedge member 102 up the against the angular portion 112 of the cavity 101, the first plurality of grooves can begin to engage with the second plurality of grooves and prevent the wedge member 102 from descending back down the angular portion 112 resulting in a unidirectional system to prevent the wedge member 102 from loosening. Embodiments utilizing grooves 113,124 can use a removably couple fastener, but the wedge member 102 may remain locked within the cavity 101 and against the object 1.

The wedge member 102 can include a through hole 125 extending between the trailing edge 121 and leading edge 120 to accommodate the fastener 126 that may be provided in redundancy or alone to secure the wedge member 102 within the cavity 101. In the shown assemblies, this fastener 126 can be a threaded rod, bolt, or thumb screw that can be easily manipulated to secure the wedge member 102 against the mounting structure 1 and within the cavity 101. In some exemplary embodiment, a portion of the through hole 125 can be threaded and configured to engage a fastener 126. The fastener 126 can bias the wedge portion within the housing 100 between a plurality of positions and can slide the wedge member 102 up the angular portion 112 of the housing 100 to apply a compressive force against the mounting surface 1 of the object 10.

FIGS. 4A-4D provide an alternative embodiment wherein the first surface 122 can be formed in a curvature configuration to approximate the radius of an axel 1. The housing 100 can have one or more raised member(s) 131 formed within the cavity 101. The raised member(s) 131 can be formed in an angular orientation. The first side 141 of the housing 100 can be generally closed and form a cap portion for the device 100. The second side 143 of the housing can include the cavity 101 for the wedge member 102. The raised members 131 angular orientation can generally extend from the second side 143 back at an include towards the first side 141 resulting in a narrowing of the cavity 101. The wedge member 102 can have its own one or more raised member(s) 132 formed within the interior surface 122. In some exemplary embodiments, the raised members 132 can be formed to have an angular orientation similar to that of the orientation of the raised members of the housing 131. The raised members 132 can help to better engage and compress against the mounting surface 1 or axel 3 as the wedge member 102 is moved further within the cavity 101. In some embodiments, the wedge member 102 can have a second cavity 103 to house a nut 118 or other coupling means for the fastener 126. A cavity 103 can also be configured to have a threading to engage the fastener directly.

Figure 4A:
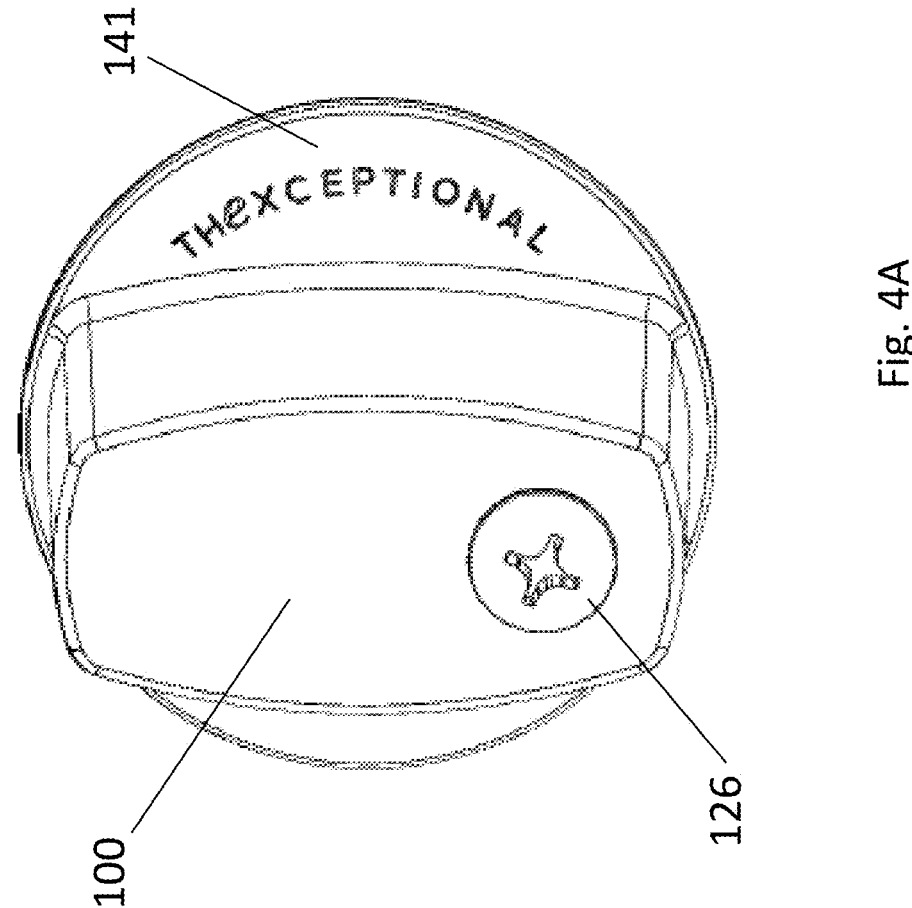
FIG. 4A is a perspective view of an exemplary embodiment of an external compression connector device of the present disclosure integrated into an axle clamp and received on an end of an axle shaft.
Figure 4B:
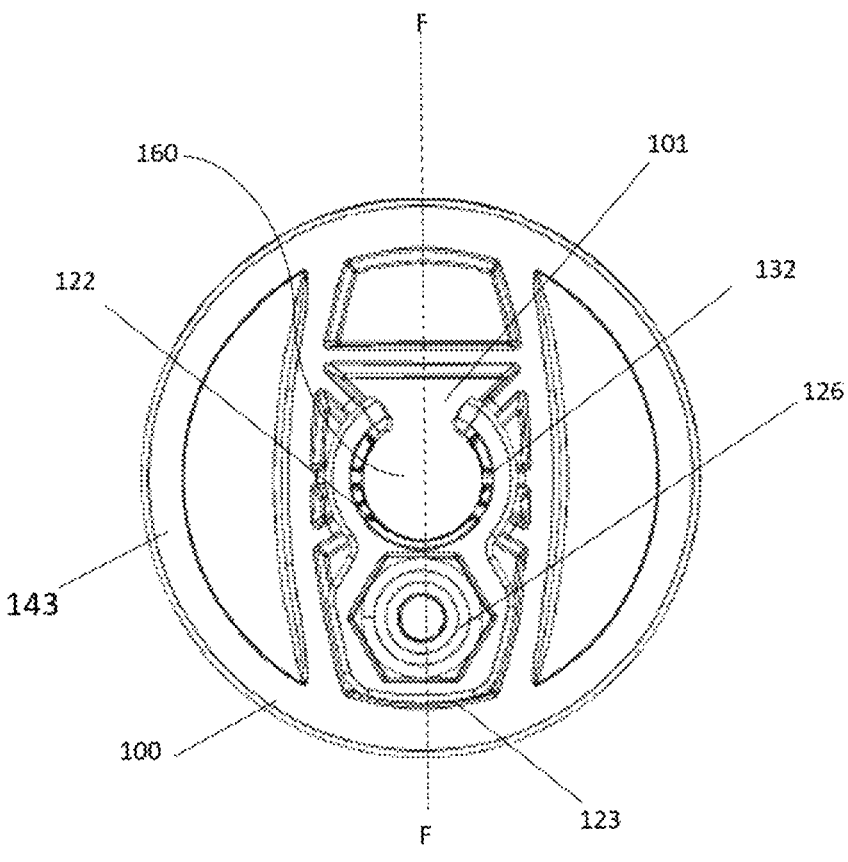
FIG. 4B is a front view of an exemplary embodiment of an external compression connector device of the present disclosure integrated into an axle clamp and received on an end of an axle shaft.
Figure 4C:
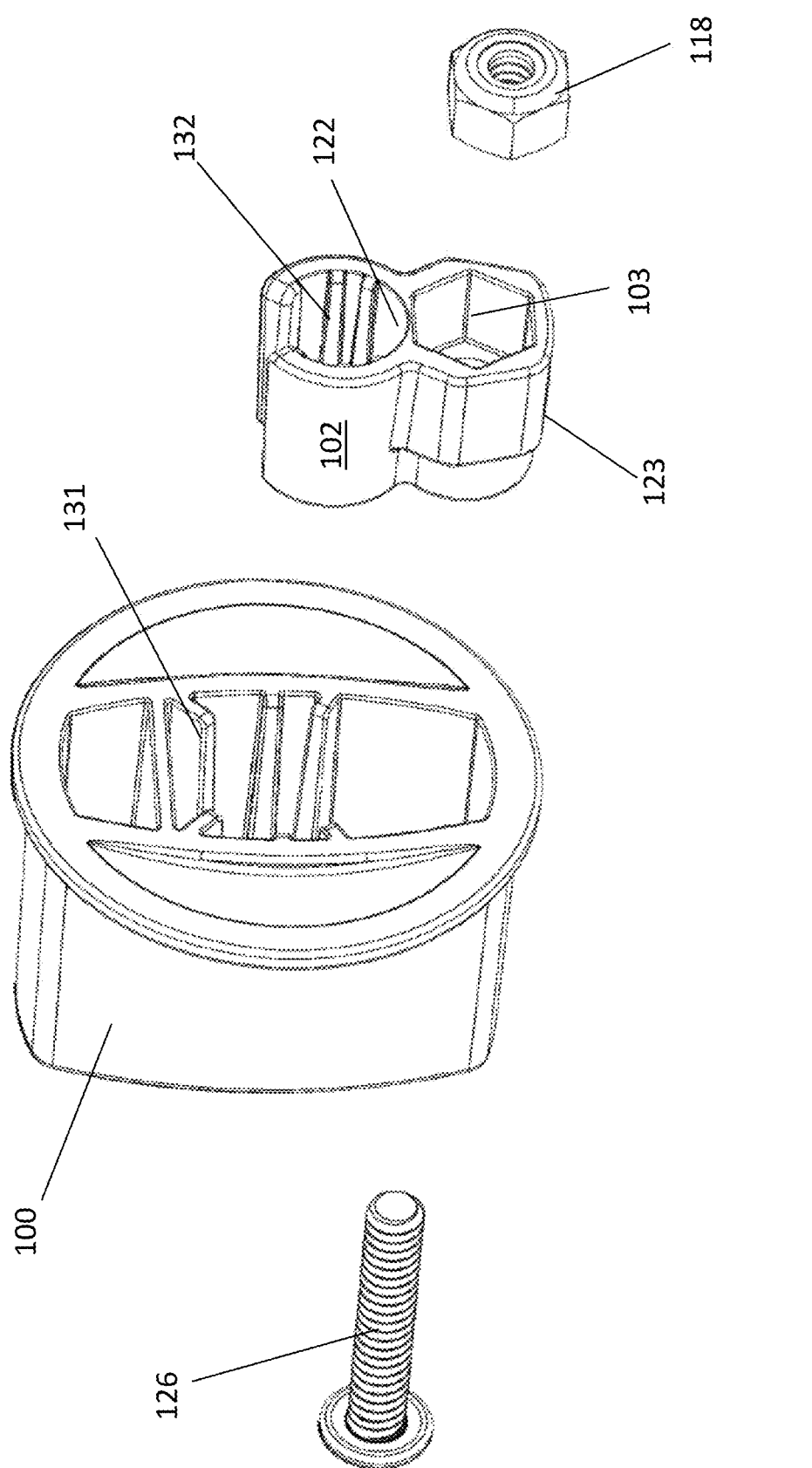
FIG. 4C is an isometric exploded view of an exemplary embodiment of an external compression connector device of the present disclosure integrated into an axle clamp and received on an end of an axle shaft.
Figure 4D:
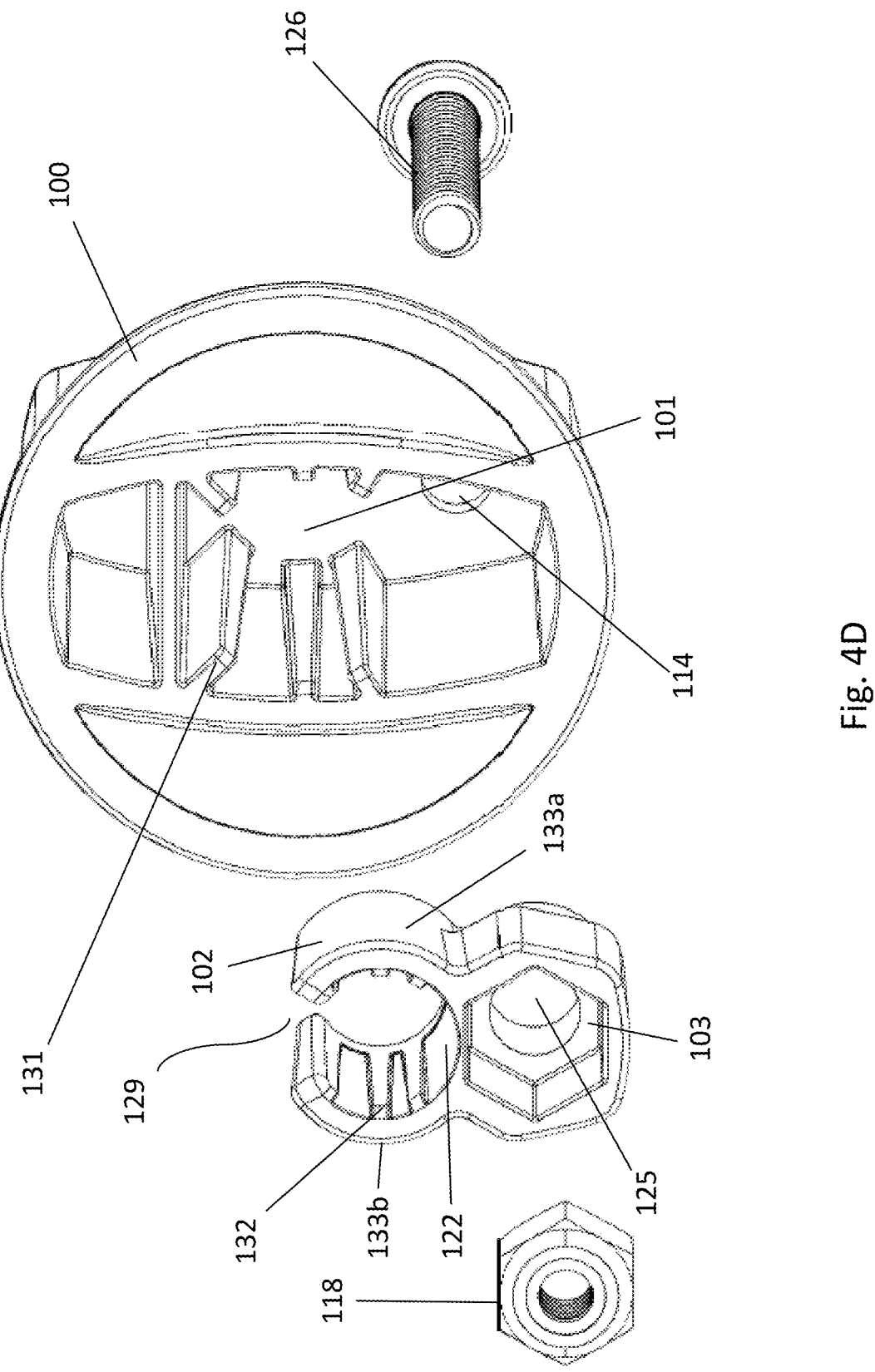
FIG. 4D is another isometric exploded view of an exemplary embodiment of an external compression connector device of the present disclosure integrated into an axle clamp and received on an end of an axle shaft.
Figure 4E:
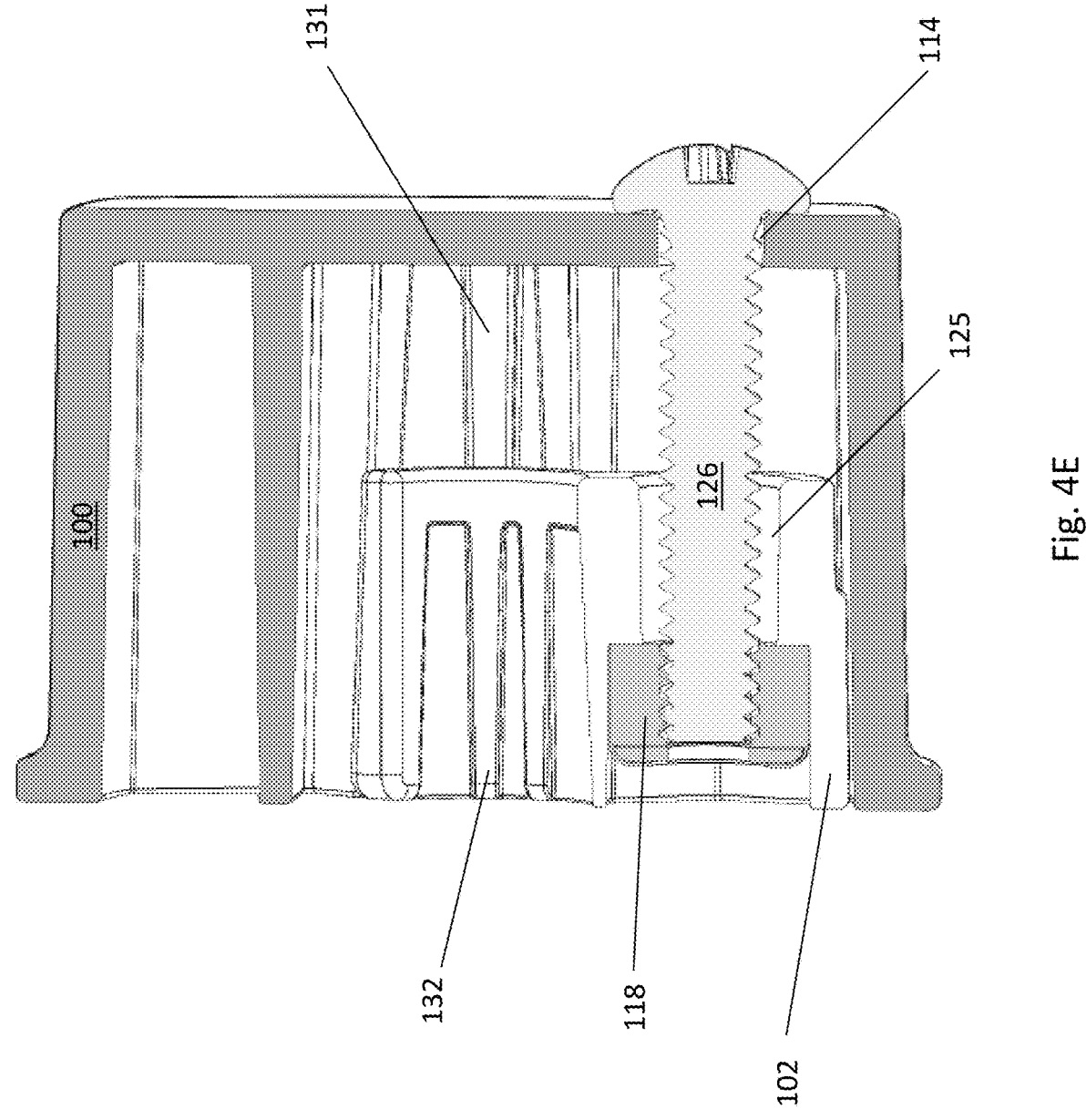
FIG. 4E is a side cross-sectional view along axis F-F of an exemplary embodiment of an external compression connector device of the present disclosure integrated into an axle clamp and received on an end of an axle shaft.

The wedge member 102 can have a first wall 133*a* extending generally upward from the first surface 122 and a second wall 133*b* extending generally upward from the first surface 122, wherein the first 133*a* and second wall 133*b* can have a curvature configured to accept a round shape between the first surface 122, the first wall 133*a*, and the second wall 133*b*. FIG. 4C shows the first surface 122 formed in a generally round curvature with a slight relief 129 space formed. The space 129 allows for the wedge member 102 to have some flexibility and further clamp against a mounting surface 1 of an axel as the wedge member 102 is further moved within the cavity 101. The raised member(s) 131 of the housing 100 can exert a force against the walls 133 of the wedge member 102 further providing compressive force against the mounting surface 1. In some exemplary embodiments, the walls 133 can extend generally upward from the first surface 122 and can have a similar curvature as the first surface curvature. As the wedge member 102 is moved further within the cavity 101, the angular shape of the raised members 131 can apply further compressive force against the walls 133*a,b* moving them from a first position to a second position, and thereby applying a further compressive force against the object 1 within the device 10. In other embodiments, the walls 133 can be shaped to conform to the shape of a desired object 1.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A compression device for mounting to an object, comprising:

a housing member, comprising a first cavity configured to position a portion of the object within the first cavity, wherein the first cavity approximates a mounting surface of the object and wherein a portion of the sidewall of the first cavity has a generally angular portion in shape and having an open end, a fixed end, and an angular surface;

a wedge member having a leading edge, a trailing edge, a through hole that includes a threaded portion, a first surface and a second surface, wherein the first surface is configured to engage the object and the second surface is configured to slide along the angular portion of the first cavity, wherein at least a portion wedge member is configured to be positioned within the first cavity; and a fastener having a threaded end configured to engage the threaded portion of the through hole to bias the wedge member between a first position to a second position, within the first cavity between a plurality of positions, wherein the wedge member exerts a compressive force against the mounting surface of the object when positioned at the second position.

2. The device of claim 1, wherein the housing member further comprises a second cavity having a threaded sidewall through and wherein the threaded end of the fastener is configured to engage the threaded portion of the second cavity to bias the wedge member and apply a compressive force against the mounting surface of the object.

3. The device of claim 1, wherein the housing member further comprises a molded handle portion.

4. The device as in claim 1, wherein the housing member further comprises an aperture configured to allow the object to fully pass through the housing member, and the fastener is configured to extend within the through hole for engaging the wedge member to bias the wedge member relative to the first cavity.

5. The device as in claim 4, wherein the aperture is located at the fixed end and includes a nut, and wherein the fastener is a threaded rod, wherein the nut has corresponding threading portions to engage the threaded rod to bias the wedge member within the housing member.

6. The device of claim 4, wherein the angular surface of the first cavity and the second surface of the wedge member have a plurality of grooves configured to engage each other to prevent the wedge member from disengaging the housing member.

7. The device of claim 1, wherein the second surface of the wedge member further comprises a first plurality of grooves, and the angular surface of the sidewall of the first cavity further comprises a second plurality of grooves.

8. The device of claim 7, wherein the first plurality of grooves and second plurality of grooves are configured to engage one another to secure the wedge member within the first cavity portion.

9. The device of claim 1, wherein the first surface of the wedge member further comprises an engagement member.

10. The device of claim 9, wherein the engagement member comprises one or more grooves.

11. The device of claim 10, wherein each of the one or more grooves are ramp-like in shape.

12. The device of claim 9, wherein the engagement member comprises an over-molded grip portion configured to provide additional friction against the mounting surface of the object.

13. The device of claim 12, wherein the over-molded grip portion is comprised of a polymer composition.

14. The device of claim 12, wherein the wedge member has a first durometer hardness, and the over-molded grip portion has a second durometer hardness, wherein the second durometer hardness is lower than the first durometer hardness.

15. The device of claim 1, wherein the wedge member further comprises a first wall extending generally upward from the first surface and a second wall extending generally upward from the first surface, wherein the first and second wall have a curvature configured to accept a round shape between the first surface, the first wall, and the second wall.

16. The device of claim 15, wherein the first wall and second wall each have one or more raised engagement members extending from an interior surface of the wall.

17. The device of claim 16, wherein the engagement members have an angular configuration.

* * * * *